Dec. 14, 1971  S. M. SILVERSTEIN ET AL  3,626,568
METHOD FOR BONDING PINS INTO HOLES IN A HOLLOW TURBINE BLADE
Filed April 23, 1969

*INVENTORS.*
STANLEY M. SILVERSTEIN
VICTOR STRAUTMAN
BY
ATTORNEYS.

United States Patent Office 3,626,568
Patented Dec. 14, 1971

3,626,568
METHOD FOR BONDING PINS INTO HOLES IN A HOLLOW TURBINE BLADE
Stanley M. Silverstein, Stratford, and Victor Strautman, Trumbull, Conn., assignors to Avco Corporation, Stratford, Conn.
Filed Apr. 23, 1969, Ser. No. 818,557
Int. Cl. B21k 3/04; B23p 15/02, 15/04
U.S. Cl. 29—156.8 H
2 Claims

ABSTRACT OF THE DISCLOSURE

This disclosure relates to turbine blades and the method for bonding pins or inserts into the holes which are formed in the turbine blades during casting.

BACKGROUND OF THE INVENTION

This invention relates to turbine blades and the method of attaching pins or plugs in turbine blades and more particularly to the diffusion bonding of pins in turbine blades.

Undesirable holes or apertures are formed in the process of casting turbine blades, as a result of the holding fixtures required in the casting process. These holes must be plugged before the blades are usable. In the past, it has been the usual procedure to weld or braze plugs in the holes. The use of electron beam welding methods to secure the plug in the hole has been widely accepted. The welding and/or brazing steps are effective but, from a manufacturing standpoint, these methods are expensive and time-consumping because of the extra equipment facilities required to perform this function.

A further step in the manufacturing of the turbine blades is to provide a coating on the turbine blade to improve thermal fatigue and resistance to deterioration of the turbine blade when in use. Typical coating processes are shown in U.S. patent, Freeman et al., No. 3,155,536, issued Nov. 3, 1964; U.S. patent, Baranow et al., No. 3,515,095, issued June 2, 1970; and U.S. patent application of Baranow, Ser. No. 686,852, filed Nov. 30, 1967.

It is an object of the present invention to provide a turbine blade at a considerable cost saving with respect to time and equipment needed for the bonding of pins in holes of the blades as compared to the previous methods of welding and brazing.

A further object of this invention is to provide a method for bonding pins in casting holes in turbine blades in which the bonding may be accomplished in the final coating step.

Other objects of the present invention will be apparent to those skilled in the art in view of the steps and procedures hereinafter described.

SUMMARY OF THE INVENTION

This invention describes a turbine blade and the method of bonding an insert in the holes formed in turbine blades resulting from the holding fixtures used during the casting process. A pin or insert, having a coefficient of expansion greater than that of the blade, is placed in the holes and the resulting assemblage heated to a temperature wherein diffusion bonding of the insert to the blade takes place.

Other details, uses, and advantages of this invention will become apparent as the following description of the exemplary embodiment and method thereof presented in the accompanying drawings proceeds.

BRIEF DESCRIPTION OF THE DRAWINGS

The accompanying drawings show a present exemplary embodiment of this invention in which.

DETAILED DESCRIPTION OF THE INVENTION

Figure 1:
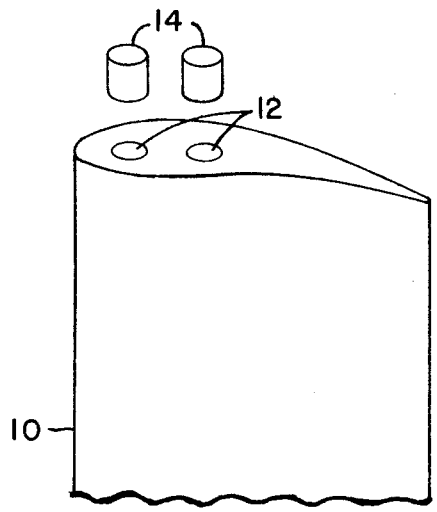
FIG. 1 is a perspective view of the invention prior to the insertion of the pin in the opening of the turbine blade.
Figure 2:
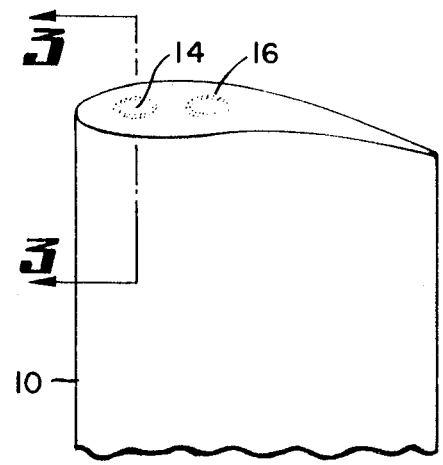
FIG. 2 is a perspective view of the turbine blade after the pin has been bonded thereto.
Figure 3:
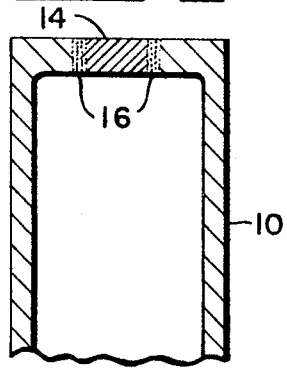
FIG. 3 is a cross-sectional view taken along line 2—2 of FIG. 2.

In the casting of hollow turbine blades shown generally as 10, the holding fixtures used leave corresponding holes or apertures 12 in the blade. The number of holes will depend on the holding fixture used. These holes are undesirable and must be plugged before the turbine blade 10 can be utilized. The common procedure is to place a pin or insert in the hole and weld the pin therein.

In the performance of this invention, a solid pin or insert 14 having an alloy composition with a coefficient of expansion greater than that of the blade alloy is inserted in the hole 12. One example that has been used is a Hastelloy pin and B1910 alloy blades. Prior to insertion, the pin 14 and blade 10 are cleaned by known techniques to remove any surface impurities that may be on the respective surfaces. The cross-sectional dimension or size of the pin is such that the pin has essentially a zero to a slight interface fit such that when the pin is inserted in the blade hole 12, there is a direct pin-to-blade contact. The necessary compressive force for bonding across the pin-blade interface is greatly enhanced because of the extremely tight fit of the pin to the blade and a difference in expansion rates as will be explained herebelow. Any portion of the pin extending above the surface of the blade is then removed, such as by cutting or grinding.

Bonding of the pin 14 to the turbine blade 10 is accomplished by subjecting the pin 14 and blade 10 assemblage to a thermal cycle at elevated temperatures for a predetermined time which depends on the alloys being used. Because of the differing coefficient of expansion of the blade and pin, the elevated temperature will cause a greater expansion of the pin 14 than the turbine blade 10 such that a large compressive force will exist at the interface between the two components. A temperature is used and maintained for a predetermined time such that the blade 10 and pin 14 become united, one to the other in the area shown generally as 16, because of the phenomenon of diffusion bonding of the two metals.

The turbine blade can now be subjected to the coating processes which are described in the aforementioned patent and applications which are incorporated herein by reference. Since the coating processes utilize high temperature cycles, it is possible to utilize the coating process to provide the necessary temperature for the diffusion bonding of the pin to the blade.

From the foregoing description it will be appreciated that the present invention provides a simple and effective method for the bonding of a pin in turbine blades.

While the present exemplary embodiment of this invention has been illustrated and described, it will be recognized that this invention may be otherwise variously embodied and practiced by those skilled in the art.

What is claimed is:

1. In a hollow turbine blade construction having undesirable blade support holes formed by the holding fixture during the casting process, a method for bonding an insert in the undesirable holes to plug the holes in the blade comprising the steps of:
   cleaning the blade and blade insert to remove surface impurities therefrom,
   inserting the blade insert into the blade support hole, said blade insert and blade having a substantially zero interface fit so that there is direct metal-to-metal contact therebetween, said insert having a greater coefficient of expansion than the turbine blade,
   and heating the blade and insert to a diffusion bonding temperature wherein the insert is diffusion bonded within the blade support hole due to the difference in coefficient of expansion rates of the blade and insert.

2. In a turbine hollow-blade construction, a method of bonding an insert therein to plug the blade holding fixture holes created in the casting of the blade comprising the steps of:

cleaning the blade holding fixture hole and blade insert to remove surface impurities therefrom, inserting the blade insert into the blade holding fixture hole, said blade insert and fixture hole having a substantially zero interface fit so that there is direct metal-to-metal contact between the blade insert and the blade, said insert having a greater coefficient of expansion than the turbine blade, cutting the insert to form a flush surface between the blade and the insert, and coating the turbine blade to improve the thermal fatigue of the blade, said coating including the heating of the blade to a diffusion bonding temperature wherein the insert is diffusion bonded to the blade due to the difference in coefficient of expansion rates of the blade and insert.

References Cited

UNITED STATES PATENTS 3,481,024   12/1969   Bunn _____ 29—473.5
3,487,530   1/1970   Ely _____ 29—402

JOHN F. CAMPBELL, Primary Examiner

D. C. REILEY, Assistant Examiner

U.S. Cl. X.R.

29—401, 402, 446, 460, DIG. 35; 416—232